(12) United States Patent
Velazquez et al.

(10) Patent No.: US 6,512,481 B1
(45) Date of Patent: *Jan. 28, 2003

(54) COMMUNICATION SYSTEM USING GEOGRAPHIC POSITION DATA

(75) Inventors: Scott R. Velazquez, Revere, MA (US); Steven R. Broadstone, Woburn, MA (US)

(73) Assignee: TeraTech Corporation, Burlington, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/729,289

(22) Filed: Oct. 10, 1996

(51) Int. Cl.$^7$ ............... H04B 7/00; G01S 5/04
(52) U.S. Cl. .................. 342/367; 342/357.1
(58) Field of Search ................ 342/357, 367, 342/372, 359, 457, 357.1, 357.06, 357.08; 455/456, 562

(56) References Cited

U.S. PATENT DOCUMENTS

| | | | | |
|---|---|---|---|---|
| 5,119,504 A | * | 6/1992 | Durboraw, III | 342/357 |
| 5,235,633 A | * | 8/1993 | Dennison et al. | 342/357 |
| 5,317,322 A | * | 5/1994 | Grobert | 342/378 |
| 5,548,813 A | * | 8/1996 | Charas et al. | 455/33.3 |
| 5,615,409 A | * | 3/1997 | Forssen et al. | 455/33.1 |
| 5,680,142 A | * | 10/1997 | Smith et al. | 342/372 |
| 5,818,385 A | * | 10/1998 | Bartolomew | 342/372 |
| 5,857,155 A | * | 1/1999 | Hill et al. | 455/456 |
| 5,917,446 A | * | 6/1999 | Greenspan | 342/373 |

FOREIGN PATENT DOCUMENTS

EP 540387 A2 * 5/1993 ............ H04B/7/26

OTHER PUBLICATIONS

Godara, Lal C., "Application of Antenna Arrays to Mobile Communications, Part II: Beam–Forming and Direction–of–Arrival Considerations", Proceedings of the *IEEE*, vol. 85, No. 8, pp. 1193–1245, Aug. 1997.
Freidlander, Benjamin, "Performance Analysis of a Null–Steering Algorithm Based on Direction–of–Arrival Estimation", *IEEE* Transactions on Acoustics, Speech and Signal Processing, vol. 37, No. 4. pp. 461–466, Apr. 1989.
Miller, Barry, "Satellites Free the Mobile Phone", Ieee Spectrum, pp. 26–35, Mar. 1998.
Litva et al, "Digital Beamfomring in Wireless Communications", pp. 131–156, specifically, 133–135 (Dec. 1993), Aug. 1996.*

* cited by examiner

*Primary Examiner*—Gregory C. Issing
(74) *Attorney, Agent, or Firm*—Bowditch & Dewey, LLP

(57) ABSTRACT

A wireless communication system employs directive antenna arrays and knowledge of position of users to form narrow antenna beams to and from desired users and away from undesired users to reduce co-channel interference. By reducing co-channel interference coming from different directions, spatial filtering with antenna arrays improves the call capacity of the system. A space division multiple access (SDMA) system allocates a narrow antenna beam pattern to each user in the system so that each user has its own communication channel free from co-channel interference. The position of the users is determined using geo-location techniques. Geo-location can be derived via triangulation between cellular base stations or via a global positioning system (GPS) receiver.

60 Claims, 14 Drawing Sheets

COMMUNICATION SYSTEM USING GEOGRAPHIC POSITION DATA

BACKGROUND OF THE INVENTION

At present, the communications spectrum is at a premium, with projected high capacity requirements of Personal Communication Systems (PCS) adding to the problem. Although all modulation techniques for wireless communications suffer capacity limitations due to co-channel interference, spread spectrum, or Code Division Multile Access (CDMA), is a modulation technique which is particularly suited to take advantage of spatial processing to increase user capacity. Spread spectrum increases signal bandwidth from R (bits/sec) to W (Hz), where W>>R, so multiple signals can share the same frequency spectrum. Because they share the same spectrum, all users are considered to be co-channel interferers. Capacity is inversely proportional to interference power, so reducing the interference increases the capacity.

Some rudimentary spatial processing can be used to reduce interference, such as using sector antennas. Instead of using a single omnidirectional antenna, three antennas each with a 120 degree sector can be used to effectively reduce the interference by three, because, on average, each antenna will only be looking at ⅓ of the users. By repeating the communications hardware for each antenna, the capacity is tripled.

Ideally, adaptive antenna arrays can be used to effectively eliminate interference from other users. Assuming infinitesimal beamwidth and perfect tracking, adaptive array processing (AAP) can provide a unique, interference-free channel for each user. This example of space division multiple access (SDMA) allows every user in the system to communicate at the same time using the same frequency channel. Such an AAP SDMA system is impractical, however, because it requires infinitely many antennas and complex signal processing hardware. However, large numbers of antennas and infinitesimal beamwidths are not necessary to realize the practical benefits of SDMA.

SDMA allows more users to communicate at the same time with the same frequency because they are spatially separated. SDMA is directly applicable to a CDMA system. It is also applicable to a time division multiple access (TDMA) system, but to take full advantage of SDMA, this requires monitoring and reassignment of time-slots to allow spatially separated users to share the same time-slot simultaneously. SDMA is also applicable to a frequency division multiple access (FDMA) system, but similarly, to take full advantage of SDMA, this requires monitoring and reassignment of frequency-slots to allow spatially separated users to share the same frequency band at the same time.

In a cellular application, SDMA directly improves frequency re-use (the ability to use the same frequency spectrum in adjoimng cells) in all three modulation schemes by reducing co-channel interference between adjacent cells. SDMA can be directly applied to the TDMA and FDMA modulation schemes even without re-assigning time or frequency slots to null co-channel interferers from nearby cells, but the capacity improvement is not as dramatic as if the time and frequency slots are re-assigned to take full advantage of SDMA.

SUMMARY OF THE INVENTION

Instead of using a fully adaptive implementation of SDMA, exploitation of information on a users' position changes the antenna beamforming from an adaptive problem to deterministic one, thereby simplifying processing complexity. Preferably, a beamformer uses a simple beam steering calculation based on position data. Smart antenna beamforming using geo-location significantly increases the capacity of simultaneous users, but without the cost and hardware complexity of an adaptive implementation. In a cellular application of the invention, using an antenna array at the base station (with a beamwidth of 30 degrees for example) yields an order of magnitude improvement in call capacity by reducing interference to and from other mobile units. Using an antenna array at the mobile unit can improve capacity by reducing interference to and from other cells (i.e., improving frequency reuse). For beamforming, the accuracy of the position estimates for each mobile user and update rates necessary to track the mobile users are well within the capabilities of small, inexpensive Global Positioning System (GPS) receivers.

In general, the present invention is a communication system with a plurality of users communicating via a wireless link. A preferred embodiment of the invention is a cellular mobile telephone system. Each user has a transmitter, receiver, an array of antennas separated in space, a device and method to determine its current location, hardware to decode and store other users' positions, and beamformer hardware. The beamformer uses the stored position information to optimally combine the signals to and from the antennas such that the resulting beam pattern is directed toward desired users and away from undesired users.

An aspect of the invention uses a deterministic direction finding system. That system uses geo-location data to compute an angle of arrival for a wireless signal. In addition, the geo-location data is used to compute a range for the wireless signal. By using the determined angle of arrival and range, a system in accordance with the invention can deterministically modify the wireless signal beam between transceivers.

BRIEF DESCRIPTION OF THE DRAWINGS

The foregoing and other objects, features and advantages of the invention, including various novel details of construction and combination of parts will be apparent from the following more particular drawings and description of preferred embodiments of the communication system using geographic position data in which like references characters refer to the same parts throughout the different views. It will be understood that the particular apparatus and methods embodying the invention are shown by way of illustration only and not as a limitation of the invention, emphasis instead being placed upon illustrating the principles of the invention. The principles and features of this invention may be employed in various and numerous embodiments without departing from the scope of the invention.

DETAILED DESCRIPTION OF PREFERRED EMBODIMENTS OF THE INVENTION

Figure 1:
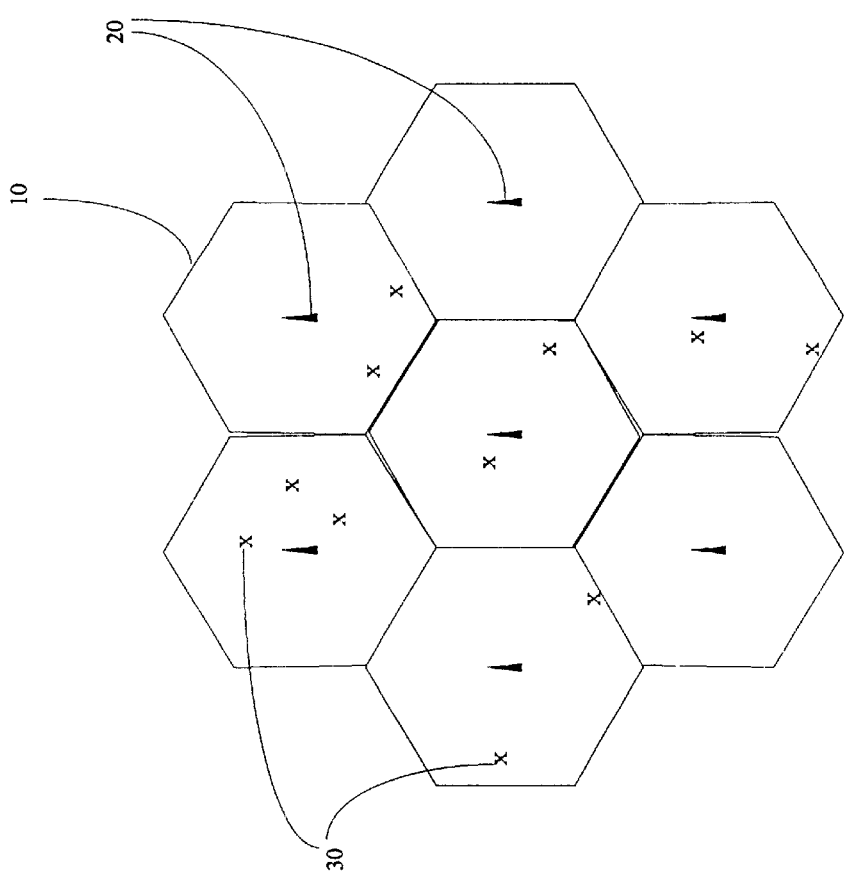
FIG. 1 is a schematic diagram of a cellular communication system.

FIG. 1 is a schematic diagram of a general land-based cellular wireless communications system. The geographic area serviced by this communications system 1 is divided into a plurality of geographic cells 10, each cell 10 having a respective geographically fixed base station 20. Each cell 10 can have an arbitrary number of mobile cellular units 30, which can travel between and among the cells 10.

Figure 2:
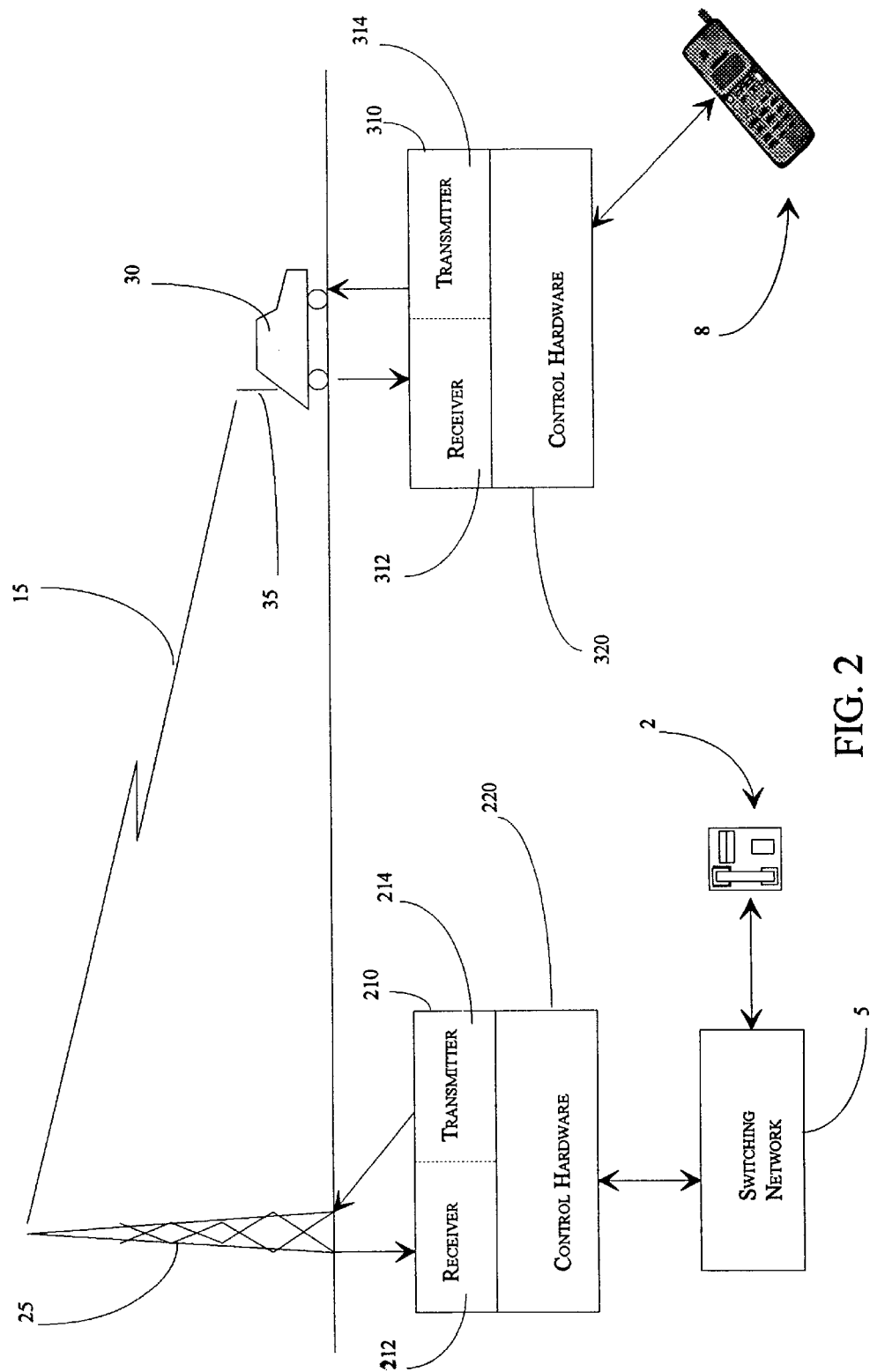
FIG. 2 is a schematic block diagram of components in a base station and a mobile unit of FIG. 1.

FIG. 2 is a schematic block diagram of components in a base station 20 and a mobile unit 30 of FIG. 1. As shown, each base station 20 includes a transceiver 210 having a transmitter 212 and a receiver 214, control hardware 220, and a set of antennas 25 to communicate with a plurality of mobile units 30. The mobile units are free to roam around the entire geographic service area. Each mobile unit 30 includes a transceiver 310 having a transmitter 312 and a receiver 314, control hardware 320, a handset 8, and an antenna or antennas 35 to allow for simultaneous sending and receiving of voice messages to the base station 20. The base station 20 communicates with a mobile telecommunications switching office (MTSO) 5 to route the calls to their proper destinations 2.

The capacity of a spread spectrum cellular communication system can be expressed as:

$$N=(W/R)(N_O/E_b)(1/D)F\ G$$

where

W is the bandwidth (typically 1.25 MHz);

R is the data rate (typically 9600 bps);

$E_b/N_O$ is the energy-to-noise ratio (typically 6 dB);

D is the voice duty-cycle (assumed to be 0.5);

F is the frequency reuse (assumed to be 0.6);

G is the number of sectors per cell (assumed to be 1, or omnidirectional); and

N is the number of simultaneous users.

As such, a typical cell can support only about 25–30 simultaneous calls. Space division multiple access (SDMA) techniques can be used to increase capacity.

The capacity improvement by using an adaptive array at the base station 20 in the mobile-base link is summarized below in Table 1. The results are valid for various antenna beamwidths at a fixed outage probability of $10^{-3}$.

TABLE I

Base Station Antenna Beamwidth vs. Call Capability in Mobile-to-Base Link

| Beamwidth (degrees) | Capacity (calls/cell) |
|---|---|
| 360 (omni) | 31 |
| 120 | 75 |
| 60 | 160 |
| 30 | 320 |

Figure 3:
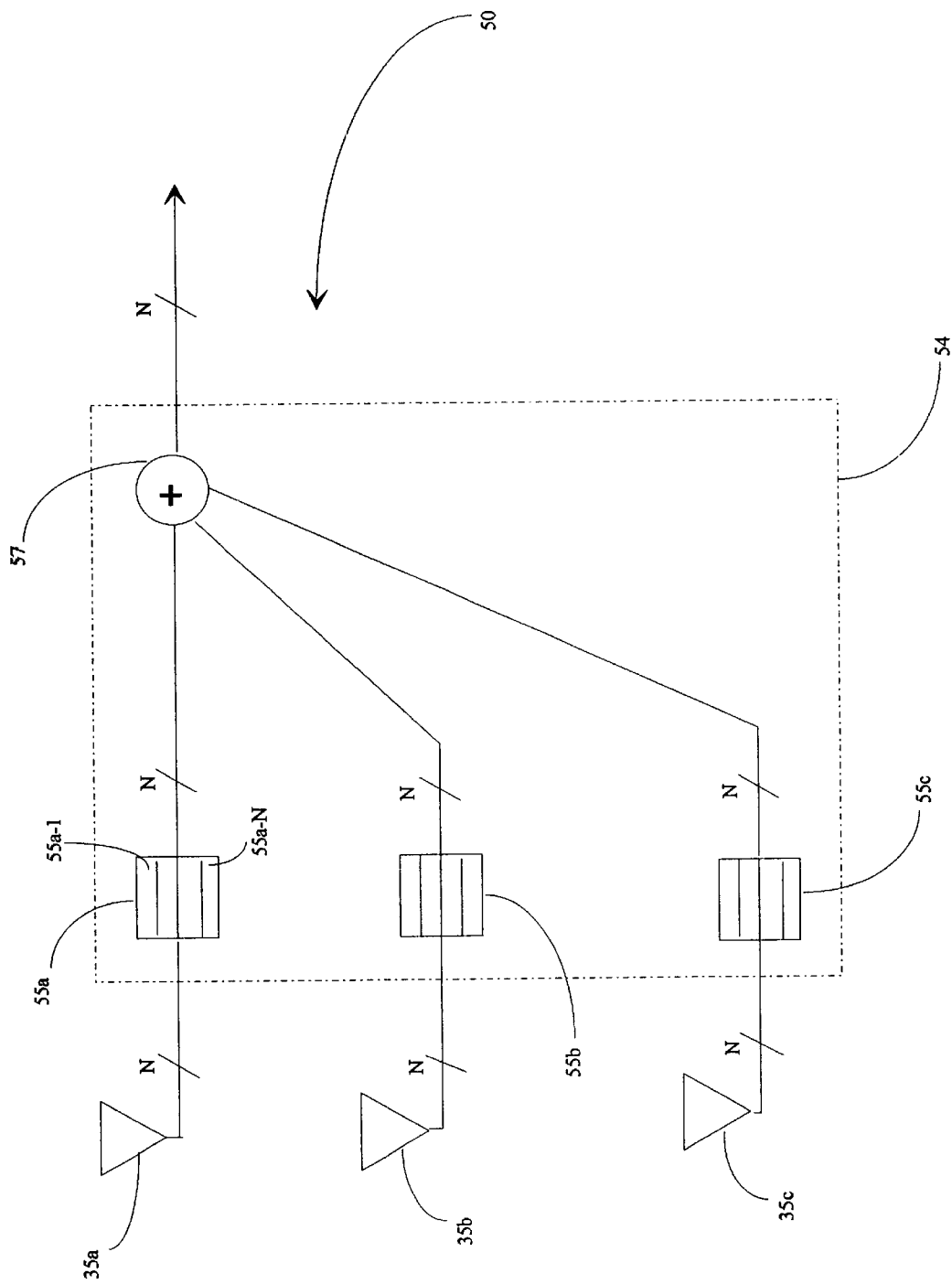
FIG. 3 is a schematic diagram of a general adaptive antenna array.

FIG. 3 is a schematic diagram of an M-element adaptive antenna array 35a, 35b, 35c and beamformer 54. Each element has N adaptive linear filters (ALFs) 55, where N is the number of users per cell. Each of the ALFs 55 are adapted in real time to form a beam to and from each mobile unit 30 via a combiner 57. The ALFs 55 use a variety of techniques to form an optimal beam, such as using training sequences, dynamic feedback, and property restoral algorithms. Preferably, the ALFs 55 are single chip adaptive filters as described in U.S. Pat. No. 5,535,150 to Chiang, the teachings of which are incorporated herein by reference.

The M-element array is capable of nulling out M-1 co-channel interference sources. However, all the users in a CDMA cell share the same frequency band and therefore, are all co-channel interferers in the mobile-to-base link. Because the number of users, N, far exceeds the number of antennas, M, subspace methods of direction-of-arrival estimation are not applicable. Instead, a Constant Modulus Algorithm (CMA) adaptive beamforming approach is more applicable.

For the base-to-mobile link, the co-channel interferers are the neighboring base stations. Conceivably, the number of antennas in the adaptive array at the mobile could be approximately the same as the number of neighboring base stations, so subspace methods of direction-of-arrival estimation may be applicable to null out the interfering base stations. The computational complexity of both types of AAP algorithms is approximately equal.

The majority of the computational complexity incurred by using AAP in a cellular system is due to covariance formulation and copy processing. The covariance is a sum of a sequence of matrices, each of which is an outer product of complex array samples. Each term of this outer product is a complex product. The computation requires on the order of $K^2$ computations, where K is the number of antennas. Using the covariance, the AAP algorithm computes the antenna weight vector, which is applied to the received signal vectors. This is a matrix inversion, which copies the desired signal. The covariance is updated periodically, and each desired signal is copied in real time.

Overall about ½ to ⅔ of the computational complexity incurred by using AAP SDMA in a cellular system is due to the covariance formulation alone, and the remaining complexity resides in the matrix inversion for copy weight generation. The complexity, size, power consumption, and cost of implementing AAP SDMA has thus far prevented it from gaining acceptance. In preferred embodiments, the present invention achieves substantially the same results as a fully adaptive implementation of SDMA but with significantly less hardware complexity, smaller size, lower power consumption, and lower cost.

Figure 4:
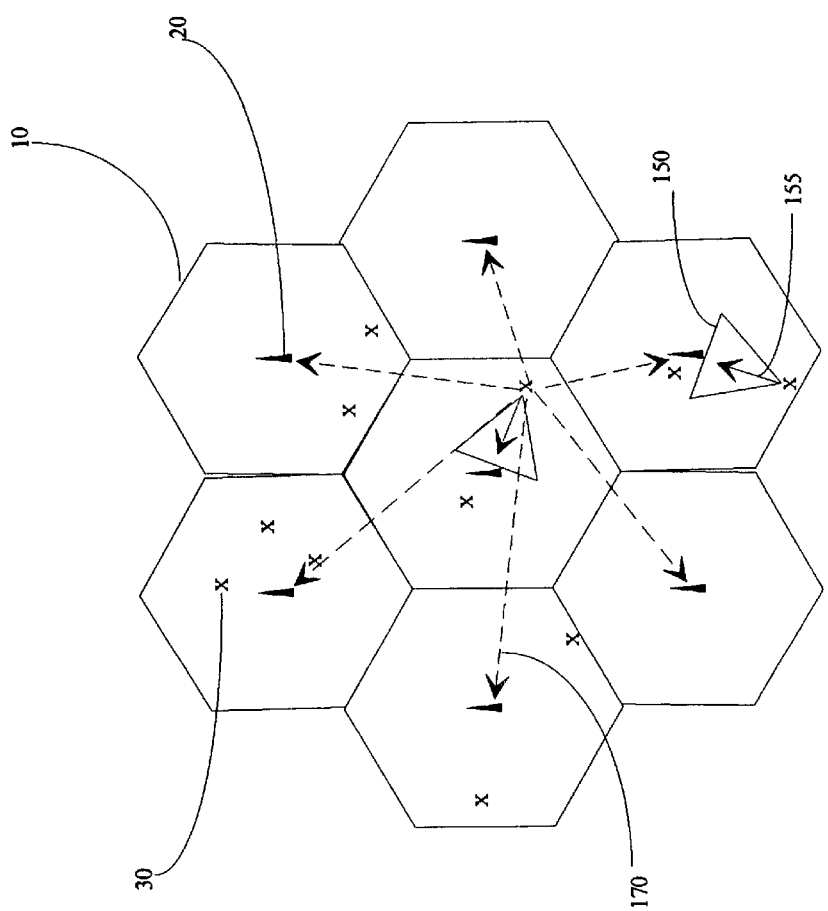
FIG. 4 is a schematic diagram of a mobile-to-base communications link in cellular communications using AAP SDMA.

FIG. 4 is a schematic diagram of a mobile-to-base communication link in a cellular communications system using AAP SDMA. Illustrated are the antenna array SDMA transmission beam patterns 150 from the mobile units 30 to the base station 20 along a central direction 155. Also illustrated is interference 170 which would exist without SDMA.

Assuming the base station 20 employs a multi-antenna adaptive array while the mobile unit 30 uses a single omnidirectional antenna, in the reverse channel (uplink, or mobile-to-base), the base station array reduces interference from other users both in-cell and out-of-cell, as illustrated in FIG. 4, by pointing its reception beam only towards the desired mobile unit 30.

For a 120 degree beamwidth, about ⅓ of the mobile units 30 in a cell, 10 are visible to the array, so the capacity is approximately tripled. Similarly, for a 30 degree beamwidth, about ¹⁄₁₂ of the mobile units 30 in a cell 10 are visible to the array, so the capacity is increased by a factor of approximately 12.

Assuming that both the base station 20 and the mobile unit 30 employ multi-element antenna arrays, for the reverse channel, this system significantly reduces interference from out-of-cell mobile transmitters, because they are forming beams toward their own base station 20. Ideally, this would improve the frequency reuse, F, from 0.6 to nearly 1.0, thereby increasing the capacity by nearly ⅔. Simulations on such a system show that a frequency re-use factor of F=0.8826 with a 60 degree beamwidth from the mobile unit improves capacity by 47% over the omnidirectional case (F=0.6).

Improvement due to adaptive arrays on the mobile units 30 are not as dramatic as those achieved with adaptive arrays at the base station 20. In addition, complexity, size, power, and cost can make the application of antenna arrays in mobile units 30 impractical for most situations. The reduction in inter-cell interference afforded by adaptive arrays in mobile units 30 may, however, be critical in high-traffic environments and for mobile units 30 near the cell boundaries where interference is the greatest.

Figure 5:
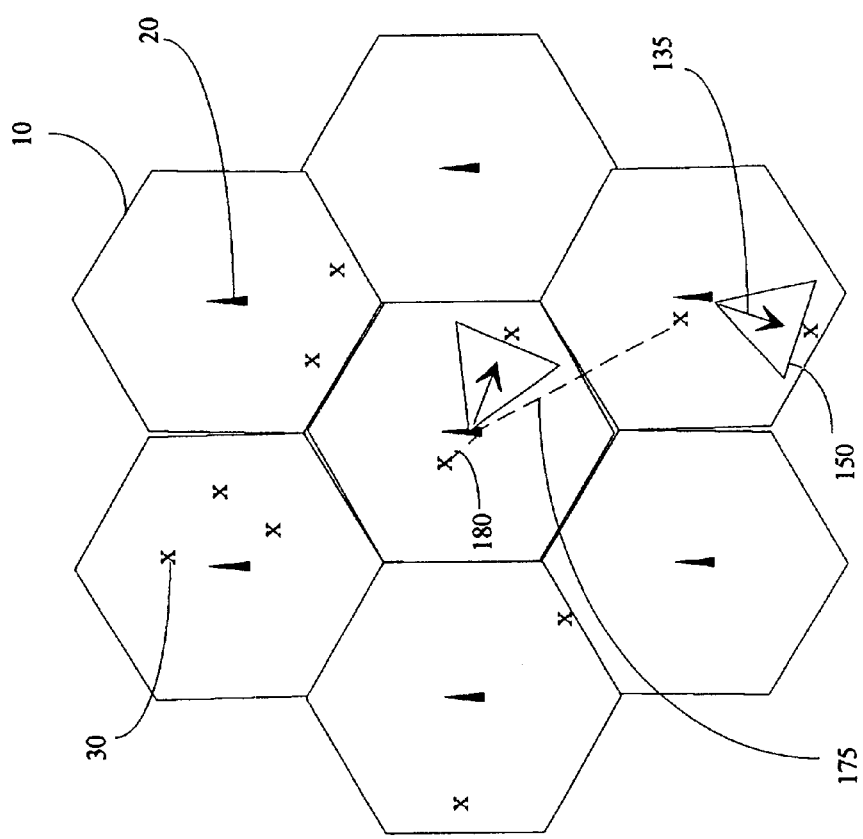
FIG. 5 is a schematic diagram of a base-to-mobile communications link in cellular communications using AAP SDMA.

FIG. 5 is a schematic diagram of a base-to-mobile communication link in a cellular communications system using AAP SDMA. Assuming the base station 20 employs a multi-antenna array while the mobile unit 30 uses a single omnidirectional antenna, in the base-to-mobile link, the base station 20 antenna array reduces interference to other users both in-cell 180 and out-of-cell 175, as illustrated in FIG. 4. Results for this channel for various beamwidths are summarized below in Table II.

TABLE II

Base Station Antenna Beamwidth vs. Call Capacity
in Base-to-Mobile Channel

| Beamwidth (degrees) | Capacity (calls\cell) |
|---|---|
| 360 (omni) | 30 |
| 75 (5 antennas) | 120 |
| 55 (7 antennas) | 165 |

Assuming that both the base station 20 and the mobile units 30 employ multi-element adaptive antenna arrays, for the forward channel, this system significantly reduces interference from out-of-cell base stations, because the mobile units 30 are forming beams toward their own base station 20. As in the reverse channel, ideally, this would improve the frequency re-use, F, from 0.6 to nearly 1.0, thereby increasing the capacity by nearly ⅔.

Figure 6:
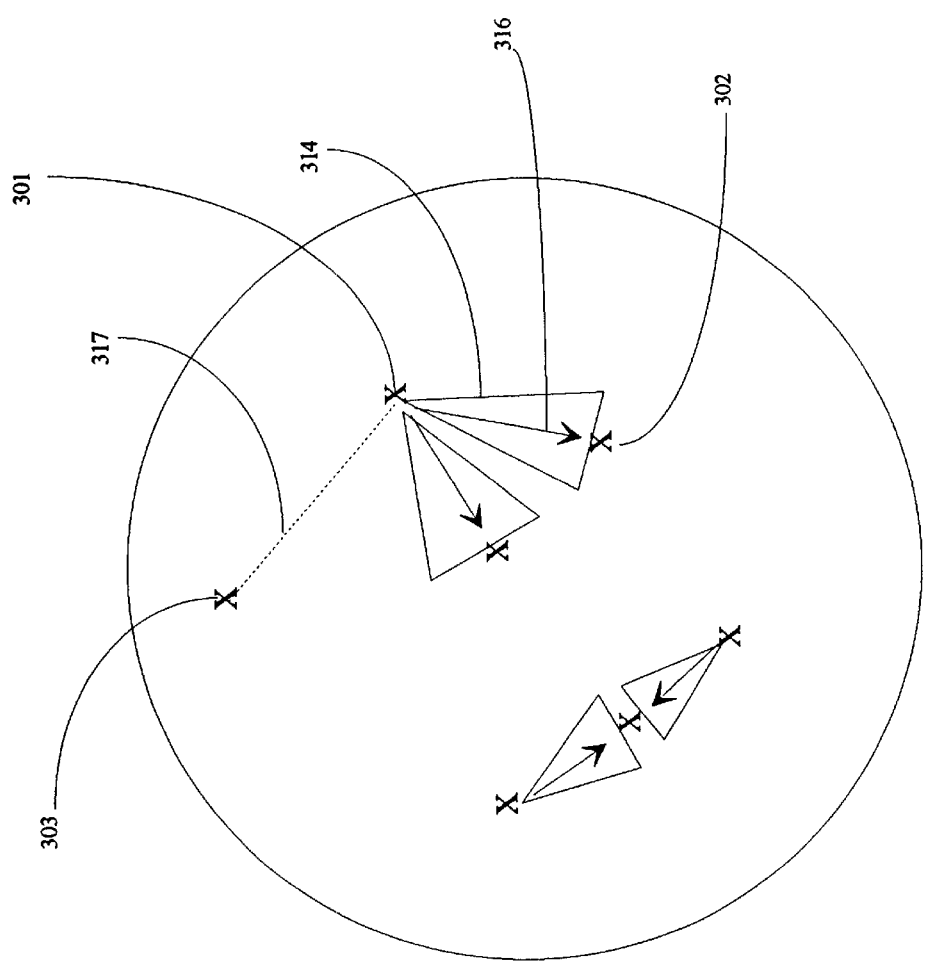
FIG. 6 is a schematic diagram of a general SDMA communications system employing geo-location techniques.

FIG. 6 is a schematic diagram of a general SDMA communications system employing geo-location techniques. As illustrated, a first user 301 and a second user 302 are in communication. The first user 301 computes the direction of the desired user 302 and a beam pattern 314 is formed along the desired direction 316. In addition to desired users 302, the first user 301 wants to avoid projecting a beam in the direction 317 of an undesired user 303. Furthermore, the first user 301 wants to avoid receiving a beam from any direction other than the desired direction 316. These goals are accomplished by utilizing a narrow directional radio beam.

The radio-beam extends from the transmitting unit at a beamwidth angle $B_o$. The distance from the transmitting unit to the receiving unit is designated as $r_m$. The beamwidth at the receiving unit is $B_m$. In a cellular system, a base unit is located at the center of a geographical cell of radius R and the receiving unit is generally mobile and moves with a velocity V.

Figure 7:
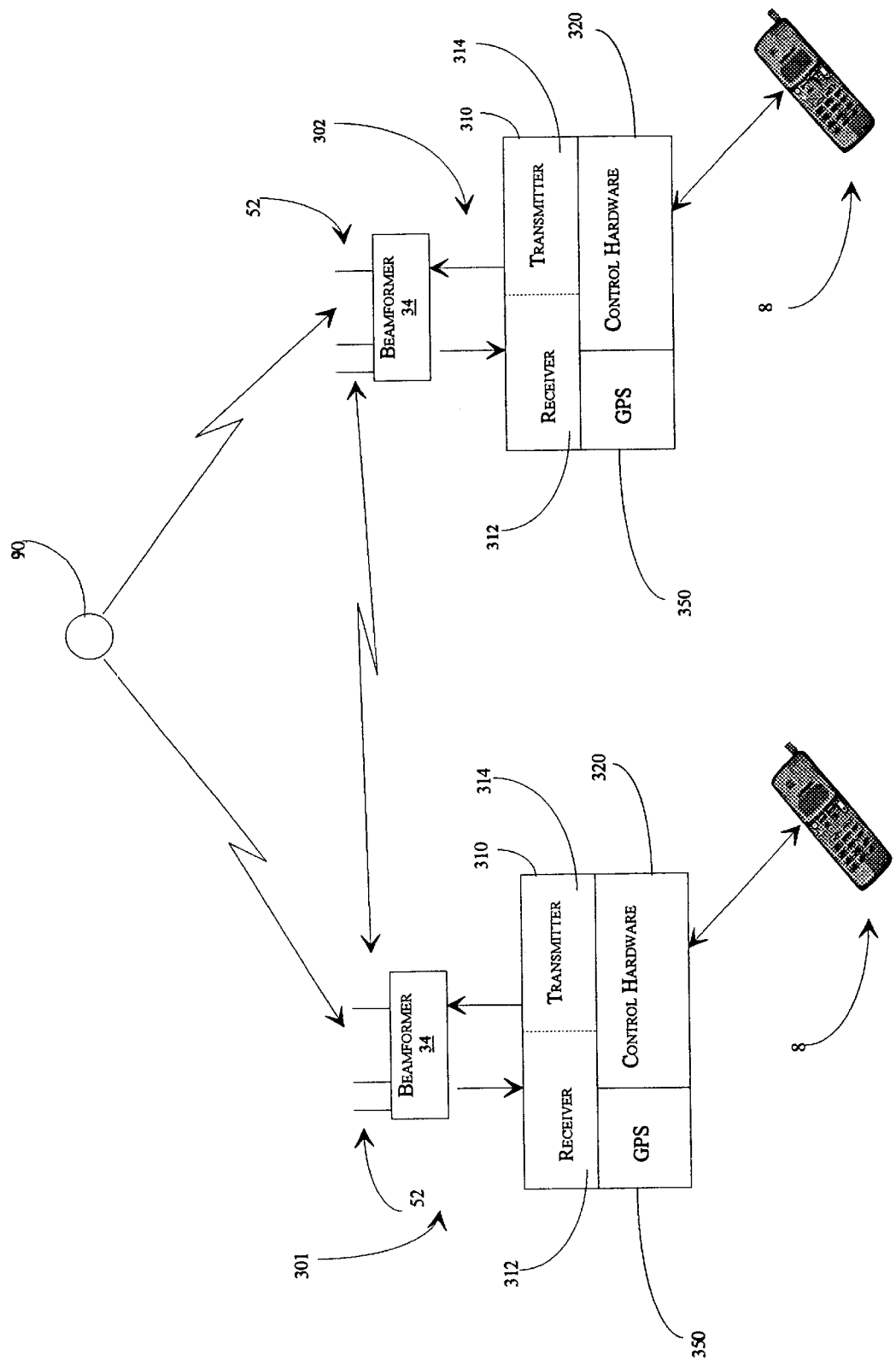
FIG. 7 is a schematic block diagram of two communicating users of FIG. 6.

FIG. 7 is a schematic block diagram of communicating users of FIG. 6. As illustrated, the first user 301 and the second user 302 receive geo-location data from a satellite system 90. The users 301, 302 communicate using a respective antenna array 52 controlled by a respective beamformer circuit 34. In addition to the standard transceiver 310 and control hardware 320, a Global Positioning System (GPS) circuit 350 communicates with a global positioning satellite system 90 to command the beamformer 34. Although a satellite system 90 is illustrated, the geo-location data can be provided by or derived from a ground-based positioning system. Furthermore, a differential global positioning system using both ground and satellite based transmitters can be employed to provide a higher resolution location.

Figure 8:
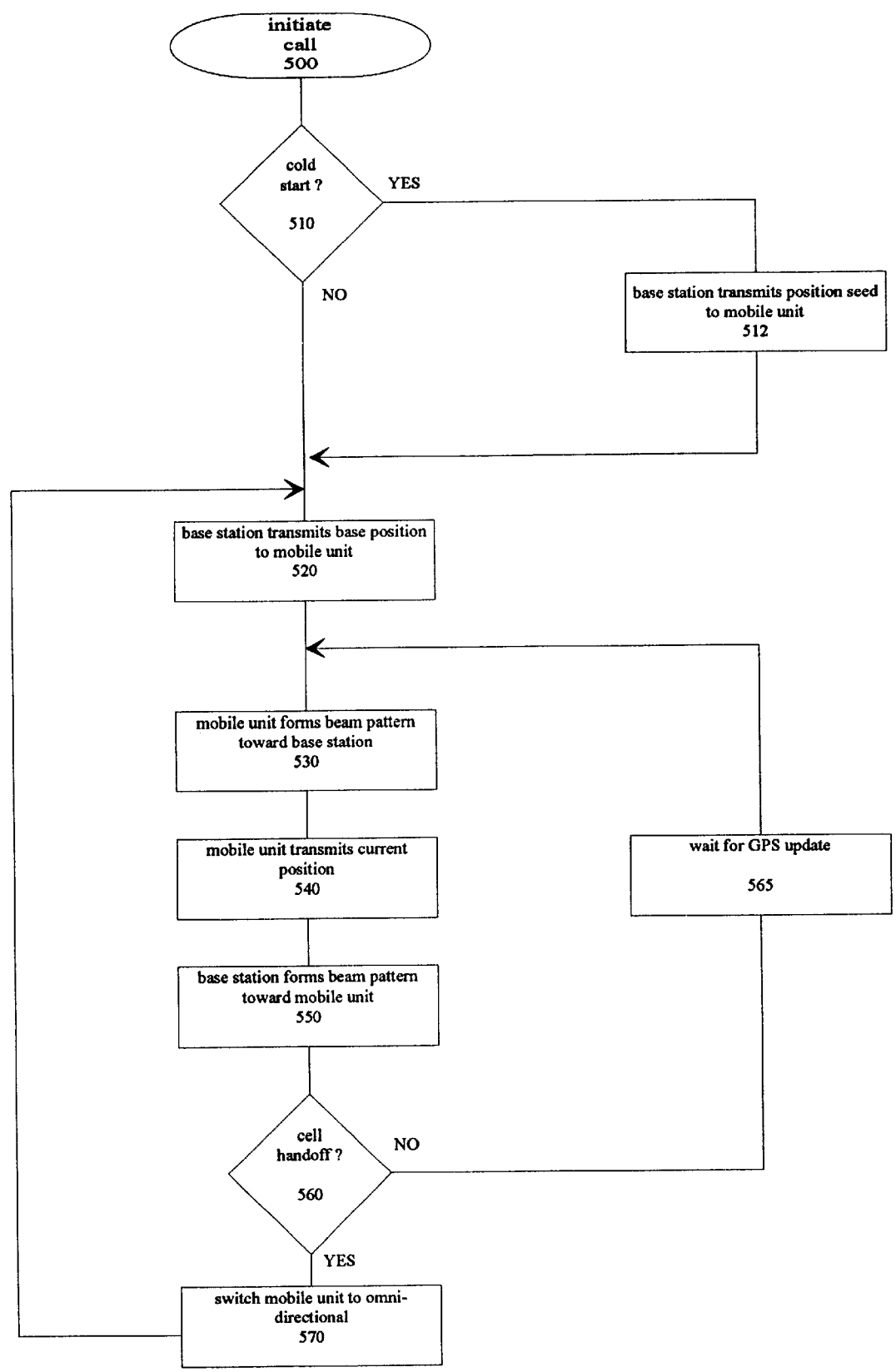
FIG. 8 is a flow chart of a method of operating a cellular telephone system using geo-location data.

FIG. 8 is a flow chart of a method of operating a cellular telephone system using geo-location data. As a part of the initial establishment of the wireless link (step 500) between the mobile unit 30 and the base station 20, the mobile unit 30 must determine its current position. The GPS receiver may not already be tracking satellites and could take several minutes to get an accurate position estimate (cold start). If the GPS receiver 350 is cold starting (step 510), the base station 20 provides a rough location estimate to orient the GPS receiver and significantly expedite the position acquisition (step 512). It can send an estimate of the mobile unit's location via triangularization from adjacent base stations. This information can be sent along with a Channel Assignment Message (which informs the mobile unit of a Traffic Channel on which to send voice and data) via a Paging Channel. Users share the Paging Channel to communicate information necessary for the establishment of calls.

Then the base station 20 transmits its position to the mobile unit 30 via the Paging Channel (Step 520). If the mobile unit 30 is employing a directive antenna array 35', it uses the base station position and its current position and heading information to form a beam pattern toward the base station 20 as described above (step 530). The mobile tunes to the Traffic Channel and starts sending a Traffic Channel preamble and the current mobile location information to the base station via a Reverse Traffic Channel (step 540). Every two seconds, the GPS location is updated and sent to the base station via the Reverse Traffic Channel.

If the mobile unit 30 is employing a directive antenna array 35', every two seconds it uses the current heading information and compares its updated position information to the stored location of the current base station to update the beam pattern toward the base station. Also, the base station 20 receives the updated mobile unit location information and updates it beam pattern toward the mobile unit (step 550). During hand-off between base stations (step 560), the directivity of the mobile antenna array, if employed, is disabled (step 570) to allow the user to communicate with other base stations.

Figure 9:
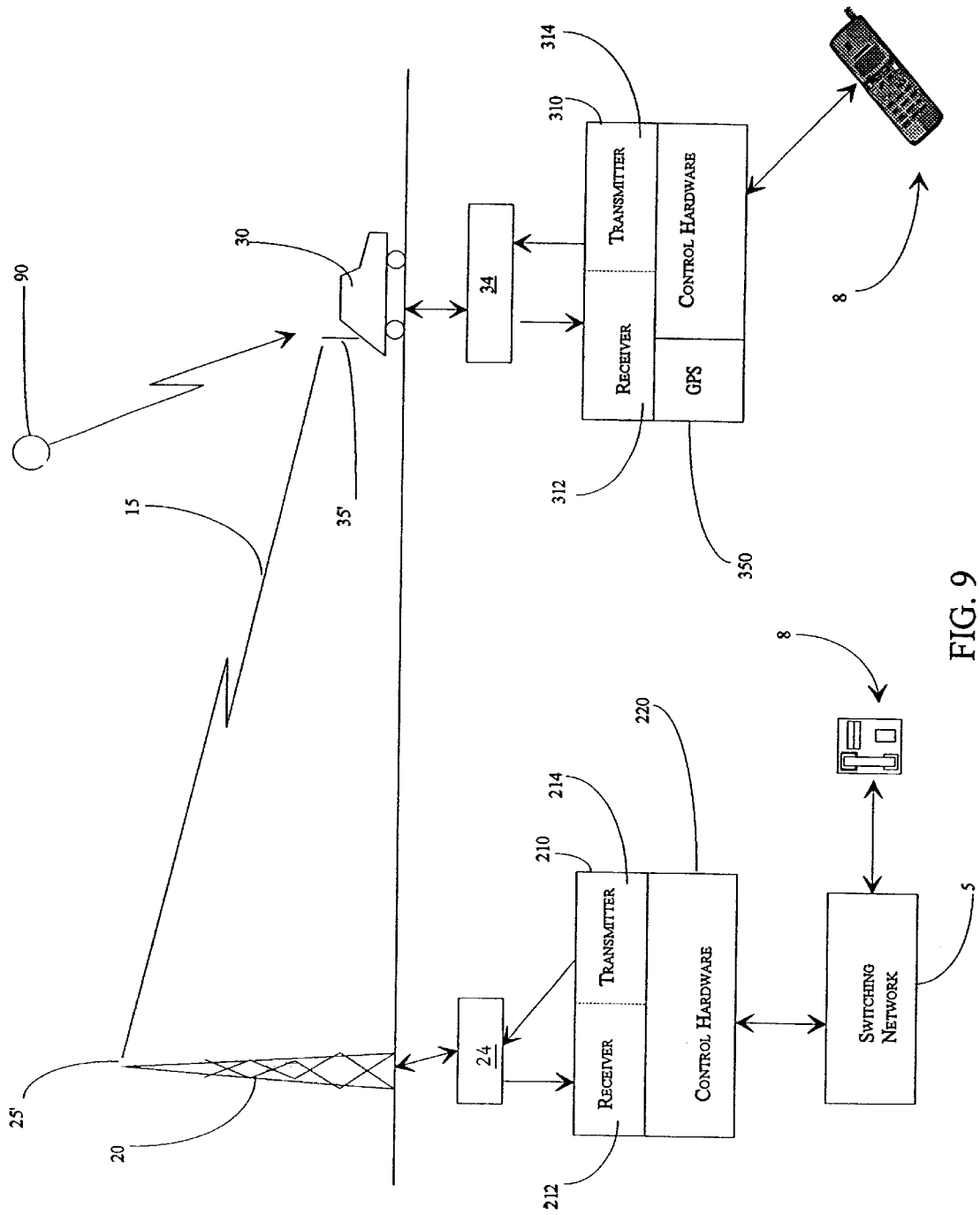
FIG. 9 is a schematic diagram of a cellular telephone system using geo-location data.

FIG. 9 is a schematic diagram of a cellular telephone system using geo-location data. A preferred embodiment is an implementation of SDMA using knowledge of user position in a cellular spead spectrum communication system. Fixed base stations 20 communicate with roving mobile units 30 within a prescribed geographic cell 10. Each base station 20 consists of a transceiver 210, a directional antenna array 25' and associated beamformer hardware 24, control hardware 220, and a transmission link with a mobile telecommunications switching office (MTSO) to route calls. The mobile unit 30 consists of handset 8 with a microphone and a speaker, a transceiver 310, a GPS receiver 350 (or other hardware to determine position of the mobile), and an omnidirectional antenna 35 or optionally a directional antenna array 35' and associated beamformer hardware 34.

A preferred embodiment of the invention employs a conventional CDMA base station 20 but with the addition of a 10-element directional antenna array 25' capable of forming antenna patterns with a beamwidth of 36 degrees, beamformer hardware 24, and additional modems to accommodate the order of magnitude increase in call capacity. The beamformer hardware 24 takes as input the current latitude and longitude of each mobile unit, compares it with the known location of the base station 20 to determine the angle of arrival (AOA) of each mobile unit's signal, and generates a set of complex antenna weights to apply to each antenna output for each mobile unit such that the combined signal represents a beam pattern steered in the direction of the desired mobile unit for both the transmit and receive signals. The complex antenna weights are calculated to simply steer the antenna beam.

Instead of calculating the weights in real-time, a set of weights can be stored in a Programmable Read-Only Memory (PROM) for a finite set of angles of arrival, and can be recalled and immediately applied. The beam pattern is preferably widened as the mobile unit 30 approaches the base station 20 (as described below) because the beam coverage decreases as the mobile unit 30 approaches the base station 20. Furthermore, the assumption that multipath components propagate from approximately the same location as the mobile unit 30 becomes less valid as the mobile unit 30 approaches the base station. Optionally, the beamformer hardware 24 can track multiple mobile units simultaneously and place nulls on interfering mobile units, but this is more computationally complex (although not as complex as a fully adaptive array).

The base station antenna array forms an antenna pattern with beamwidth $B_0$=30 degrees. Assuming the cell radius is R=6 km, the mobile unit is at radius $r_m$ (m), the maximum velocity of the mobile unit is V=100 (km/h), and the location estimate is updated at U=2 times per second, examination of the pie-slice geometry of the antenna pattern reveals that the antenna beam width at the mobile unit's location is $B_m = 2\pi r_m (B_0/360)$ meters, which decreases as the mobile unit 30 approaches the base station 20. Once a location estimate has been determined for the mobile unit 30 and transmitted to the base station 20, the base station 20 forms an antenna pattern with the main lobe centered on the mobile unit 30. In the worst case, this estimate is wrong by T=30 m. In an update cycle, the mobile travels V/U (m), and as long as this distance is less than $B_m/2$ (half the beamwidth in meters at the mobile location) minus the error in the location estimate, T, then the mobile will remain within the antenna main lobe: $V/U \leq (B_m/2) - T$. Evaluating this equation with the typical numerical values and solving for the mobile location yields $r_m \geq 167.6$ m at a velocity V=100 km/h. Therefore the mobile unit 30 remains in the beam coverage area as long as it is further than 167.6 m from the base station 20.

The base station 20 uses the location information to sense when the mobile unit 30 is closer than 167.6 m and widens the beam pattern to omnidirectional (or optionally to 120 degrees). This widening does not significantly increase interference to other users because the low power is used for nearby mobile units 30. The complex antenna weights for the widened beams are preferably stored in memory for a finite set of angles of arrival, and they can be recalled and immediately applied.

The mobile units 30 include a conventional handset 8 preferably augmented with an integrated GPS receiver 350 and modifications to the control logic 320 to incorporate the GPS position data in the transmission to the base station 20. Mobile units 30 embodied in automobiles preferably employ a three-element directional antenna array 35' mounted on the automobile and beamformer hardware 34 in addition to the handset with the built-in GPS receiver as described above. The beamformer hardware 34 stores the current base station's latitude and longitude, compares it with its own current latitude and longitude, and computes its current heading via GPS doppler information to determine the angle of the arrival of the base station signal. A look-up table (for example in a ROM) provides the antenna weights to steer the transmit and receive beam pattern toward the base station. Optionally, the beamformer hardware can track multiple base stations simultaneously and place nulls on interfering base stations.

The necessary accuracy of the mobile position determination depends on the width of the antenna beam. Assuming the location can be determined to within a tolerance of T=30 m (i.e., the location can be determined with high probability to be within a circle of radius T=30 m), as the mobile unit 30 moves, the antenna beam must cover the entire area in which the mobile unit 30 can move in the two seconds before the position is checked again and the antenna beam pattern is updated. Because of the pie-slice geometry of the beam pattern, as the mobile unit 30 approaches the base station 20, the beam coverage decreases and must be widened to cover the area in which the mobile unit 30 could travel in the two second update cycle.

Mobile units employing the antenna array 35' can form an antenna pattern with beamwidth $B_1$=120 degrees. Assuming the cell radius is R=6 km, the mobile is at radius $r_m$ (meters), the maximum rotation of the mobile unit is $\Omega$=45 degrees/second (i.e., the mobile can turn a 90 degree corner in 2 seconds), and the location estimate is updated at U=2 times per second, examination of the pie-slice geometry of the antenna pattern yields a location tolerance at the base station of $T_b = 360T/(2\pi r_m)$ (degrees), which increases as the mobile unit 30 approaches the base station 20.

In addition to location, the mobile unit 30 needs to know its direction of travel so it can determine the orientation of its antenna array. This direction vector can be deduced from GPS doppler data or from a compass.

Once a location estimate has been determined, the mobile unit 30 forms an antenna pattern with the main lobe centered on the base station 20. In the worst case, this estimate is wrong by $T_b$ (degrees) and the mobile unit 30 is turning at maximum rotation $\Omega$=45 degrees/s. In an update cycle, the mobile's main lobe rotates $\Omega/U$ (degrees), and as long as this angle is less than $B_1/2$ (half the mobile beamwidth in degrees) minus the error in the location estimate, $T_b$ (degrees), then the base station 20 will remain within the mobile antenna's main lobe, $\Omega/U \leq (B_1/2) - T_b$. Evaluating this equation with the numerical values above and solving for the mobile location yields $r_m \geq 45$ m. Therefore the base station 20 remains in the beam coverage area as long as it is further than 45 m from the mobile unit 30.

The mobile unit 30 uses its location information to sense when it is closer than 45 m to the base station 20 and widens the beam pattern to omnidirectional. Again, this widening does not significantly increase interference to other users because the power transmitted is low. A look-up table in a ROM provides the antenna weights to change the beam pattern to omnidirectional when the mobile unit 30 is within 45 m of the beam station or during call hand-off when the mobile unit 30 is communicating with more than one base station 20.

A preferred embodiment of the invention includes an aspect which reduces interference and improves capacity as long as the multipath components propagate from approximately the same direction as the line-of-sight (LOS) component, which is a fair assumption. Typically, a multipath signal is limited to a 5–10° arc relative to the receiver. As such, various techniques can be employed to identify and null the multipath component of a received signal.

Aspects of the invention can be practiced even if some users are not equipped with SDMA capability. In the case that a particular user does not employ an antenna array, the user will not use position information and will default to conventional omnidirectional transmission and/or reception. Similarly, in the case that the user does not provide position information, other users will default to conventional omnidirectional transmission to and/or reception from that user. As conventional users are phased out and SDMA equipped users are phased in, the capacity of the system will increase as the fraction of SDMA equipped users increases.

Figure 10:
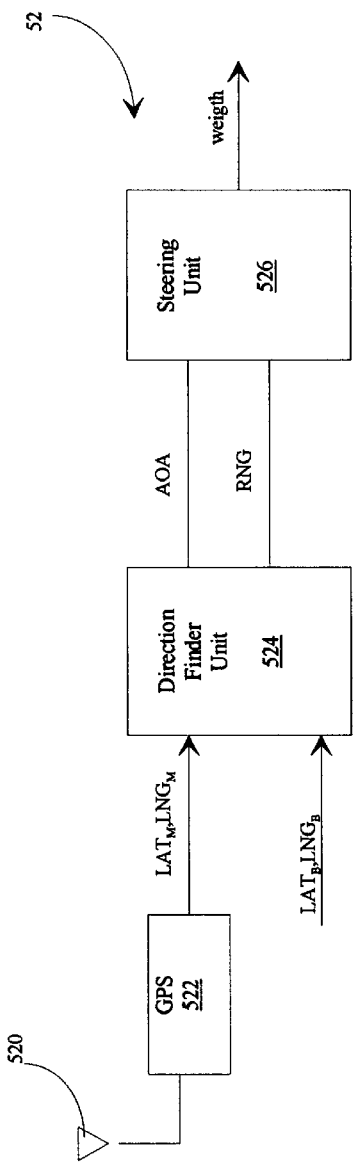
FIG. 10 is a schematic block diagram of a steering circuit.

FIG. 10 is a schematic block diagram of a steering circuit. The steering circuit 52 includes a GPS receiver 522 connected to a GPS antenna 520 for receiving GPS signals from satellites. The GPS receiver 522 computes the unit's latitude and longitude. A deterministic direction finder 524 processes the mobile unit latitude $LAT_M$ and longitude $LNG_M$ data as well as the base station latitude $LAT_B$ and longitude $LNG_B$ data using a first look-up table to compute an angle of arrival (AOA) and a range (RNG) based on the following equations:

$$AOA = \tan^{-1}\left(\frac{LNG_M - LNG_B}{LAT_M - LAT_B}\right)$$

The AOA and RNG values are processed by a second look-up table in an antenna steering unit 526 which converts the values into antenna weights. The antenna weights are calculated to steer the beam in the direction of the angle of arrival. That is, the antenna weights become unity (i.e., omnidirectional) when the range is below a prescribed threshold (i.e., the mobile unit is very close to the base station) and for the mobile unit during handoff. The antenna weights are provided to the beamformer.

Figure 11:
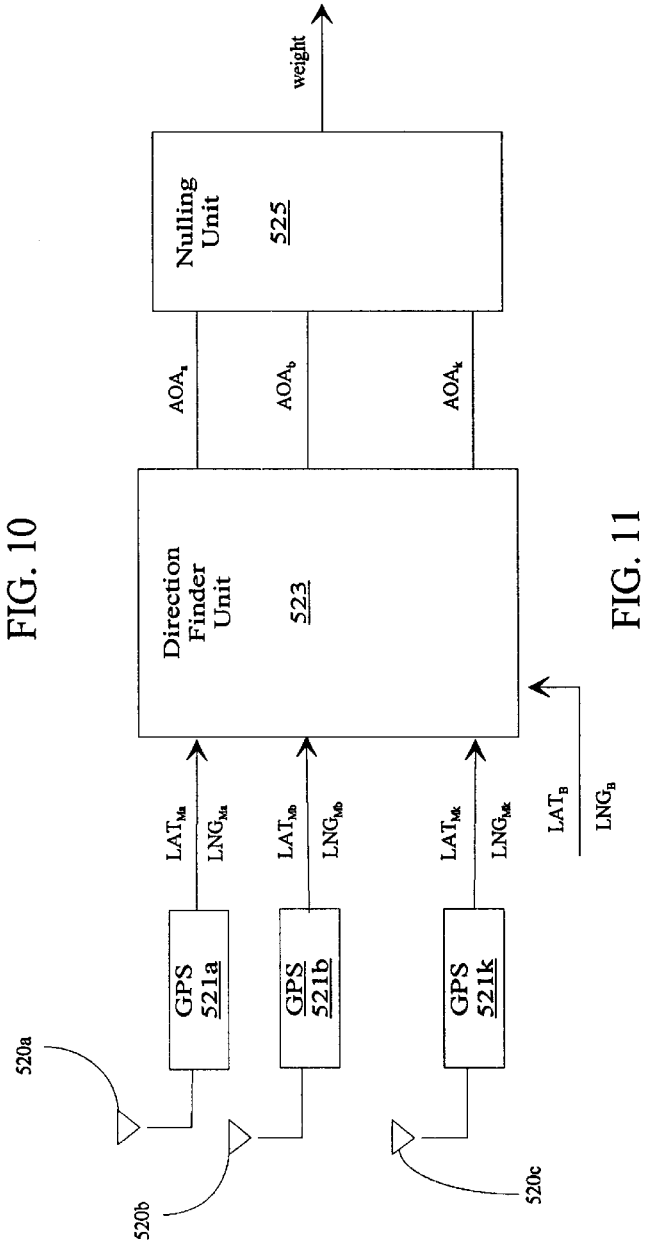
FIG. 11 is a schematic block diagram of a nulling circuit.

FIG. 11 is a schematic block diagram of a nulling circuit. Position data from each user is processed by a GPS circuit $521_a, \ldots, 521_k$. For a particular user "a", a desired latitude $LAT_{Ma}$ and longitude $LNG_{Ma}$ data are received and for other users undesirable latitude $LAT_{Mb}, \ldots, LAT_{Mk}$ and longitude $LNG_{Mb}, \ldots, LNG_{Mk}$ data are received. A first look-up table in a deterministic direction finder unit 523 converts the latitude and longitude data from the mobile units into desired $AOA_A$ and undesired $AOA_b, \ldots, AOA_k$ angles of arrival and a desired range RNG based on the base station latitude $LAT_B$ and longitude $LNG_B$ data. This information for each user is passed to a second look-up table in a nulling unit 525 which computes antenna weights which are calculated to steer the beam in the direction of the desired angle of arrival $AOA_a$ and away from the undesired angle of arrivals $AOA_b, \ldots, AOA_k$ (i.e., a circuit nulls undesired users). The antenna weights can become unity as described above. The antenna weights from the nulling unit 525 are provided to the beamformer.

Figure 12:
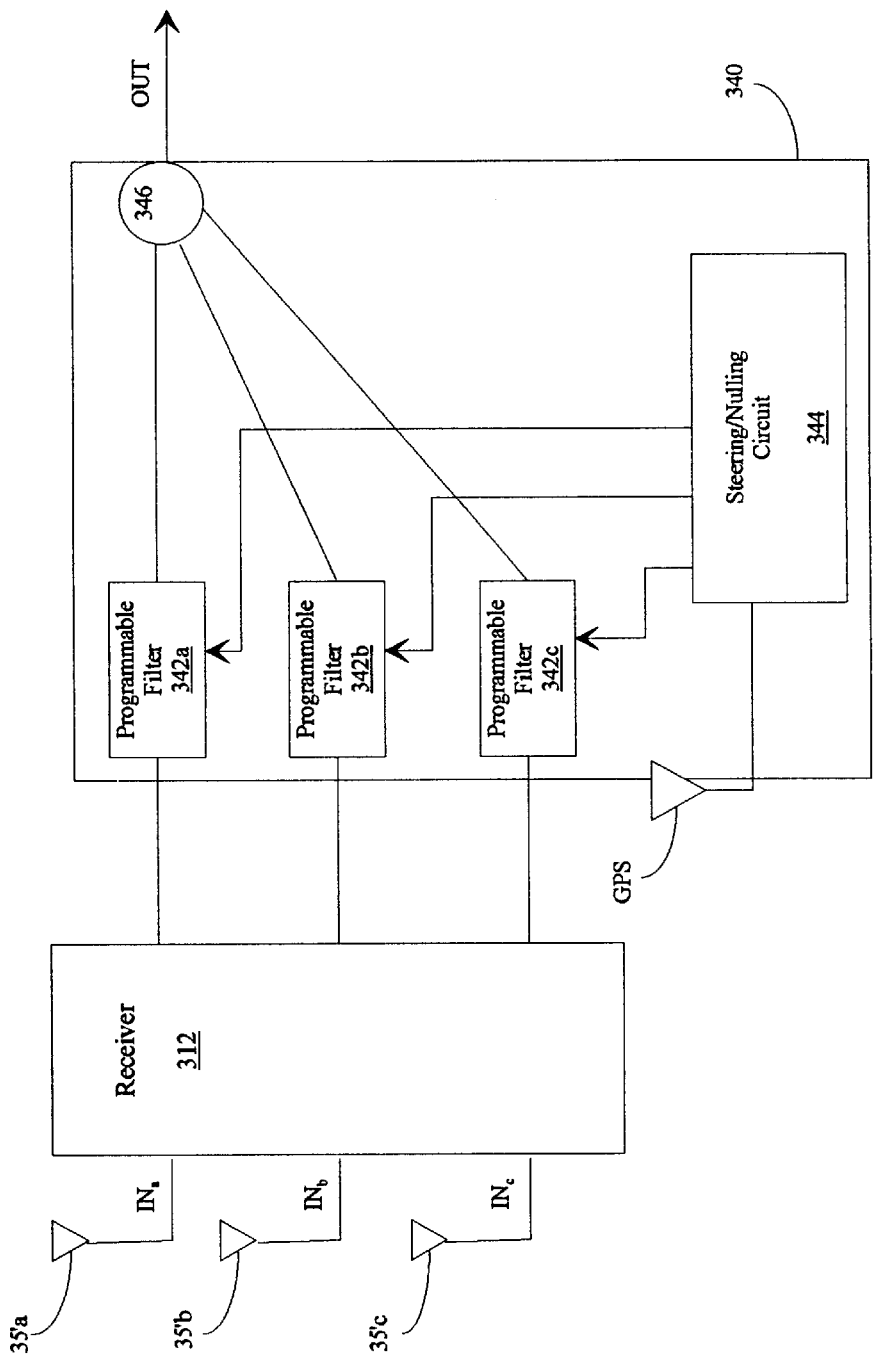
FIG. 12 is a schematic block diagram of a receiver module for a mobile unit beamformer.

FIG. 12 is a schematic block diagram of a receiver module for a mobile unit beamformer. The circuit receives a plurality of RF signals $IN_a$, $IN_b$, $IN_c$ over a respective antenna 35'a, 35'b, 35'c of a directional antenna array 35'. The RF signals are processed into three baseband signal channels by a three-channel receiver 312. Each baseband signal is processed by a programmable filter 342a, 342b, 342c. A GPS signal from a GPS receiver (not shown) is received by a steering/nulling circuit 344 operating as described above. The steering/nulling circuit 344 controls the programmable filters 342a, 342b, 342c. The outputs from the programmable filters are combined by a RF combiner 346 to produce an output signal OUT.

Figure 13:
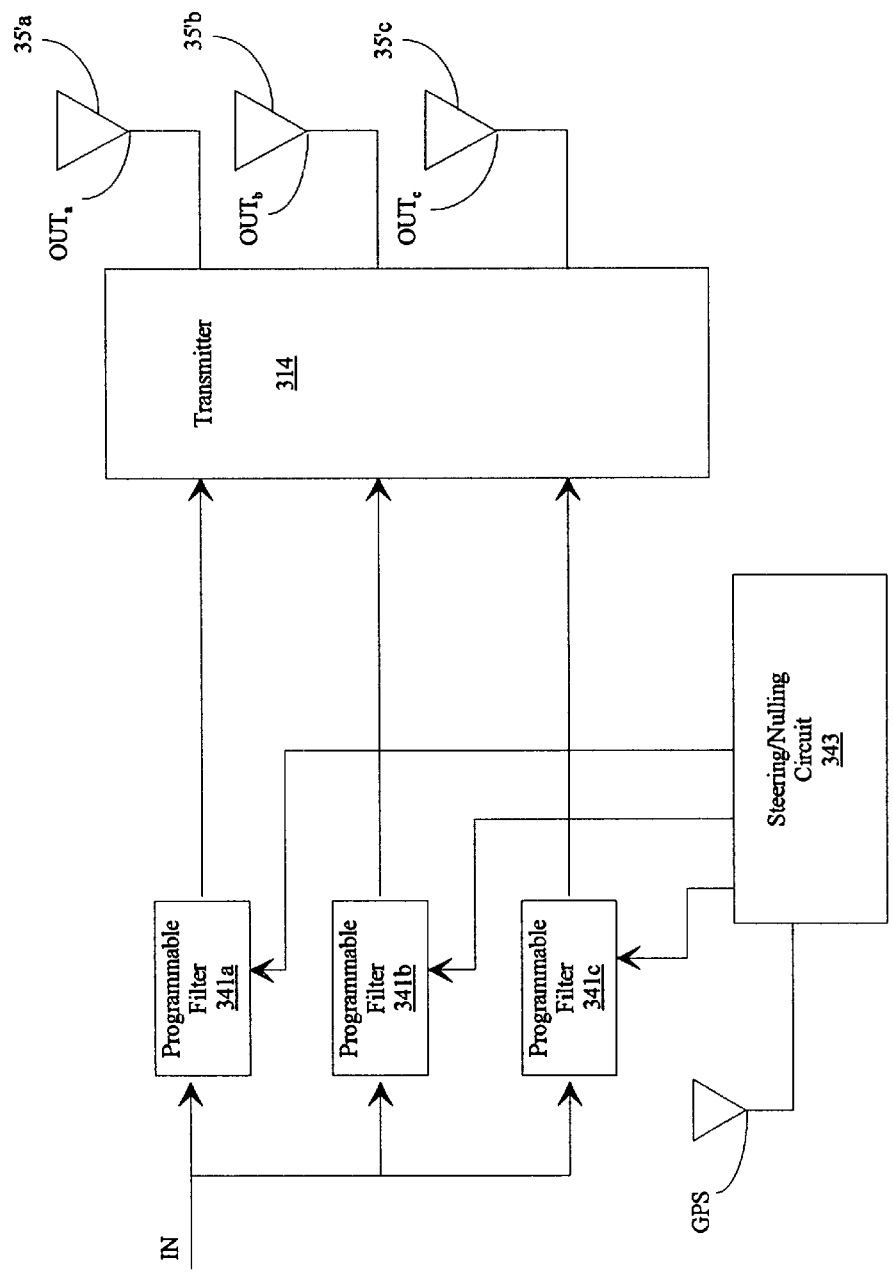
FIG. 13 is a schematic block diagram of a transmitter module for a mobile unit beamformer.

FIG. 13 is a schematic block diagram of a transmitter module for a mobile unit beamformer. The input signal IN is split three ways and processed by respective programmable filters 341a, 341b, 341c. The programmable filters 341 are controlled by a steering/nulling circuit 343 based on inputs from a GPS receiver (not shown) as described above. Three channels of baseband signals result from the programmable filters and are fed to a three-channel transmitter 314 which sends RF signals $OUT_a$, $OUT_b$, $OUT_c$ to a respective antenna 35'a, 35'b, 35'c in the antenna array 35'. In a preferred embodiment of the invention, the system implements programmable filtering by including a vector-matrix product processing system as described in U.S. Pat. No. 5,089,983 to Chiang, the teachings of which are incorporated herein by reference.

Figure 14:
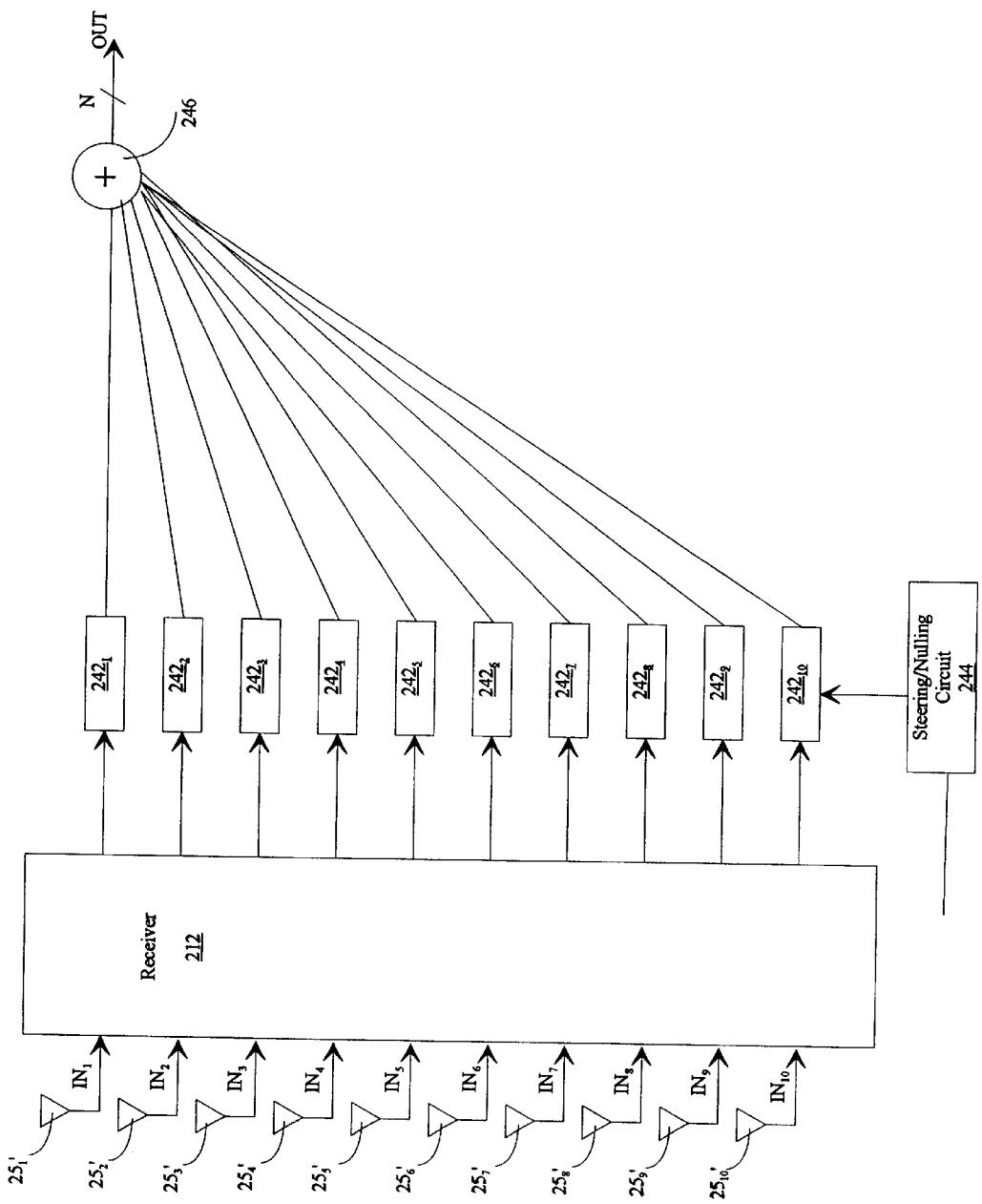
FIG. 14 is a schematic block diagram of a receiver module for a base station beamformer.

FIG. 14 is a schematic block diagram of a receiver module for a base station beamformer. As illustrated, the antenna array 25' of the base station includes 10 antennas $25'_1, \ldots, 25'_{10}$. The input signals $IN_1, \ldots, IN_{10}$ are received by a ten-channel receiver 212 which yields ten channels of baseband signals. Each channel of baseband signal is processed by a programmable filter array 242, each of which includes a respective programmable filter for each of N possible users. The programmable filters 242 are controlled by a steering/nulling circuit 244 for each user based on GPS data received from each user as described above. The outputs from the programmable filters 242 are combined by an RF combiner 246 into N outputs OUT.

Figure 15:
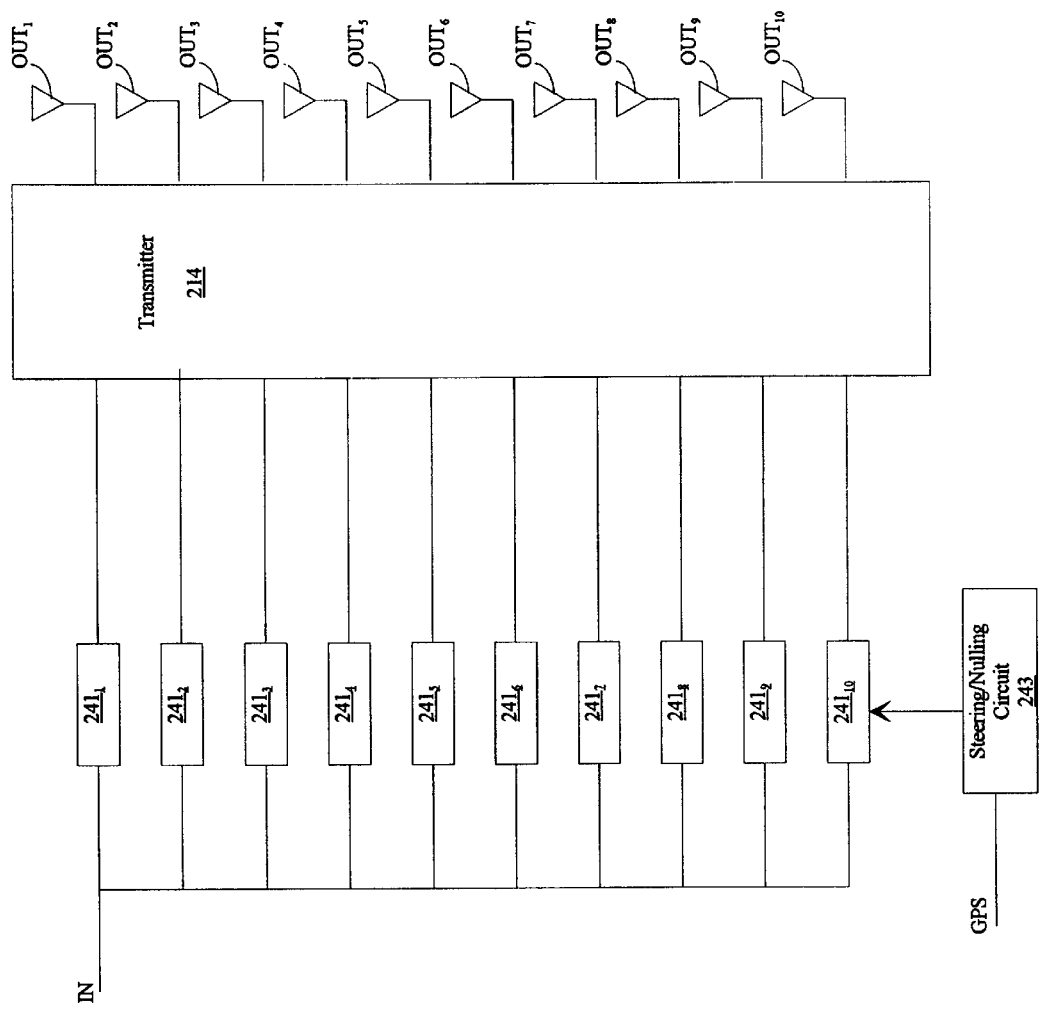
FIG. 15 is a schematic block diagram of a transmitter module for a base station beamformer.

FIG. 15 is a schematic block diagram of a transmitter module for a base station beamformer. The transmitter section receives an input signal IN which is split ten ways into ten channels. Each channel is processed by a programmable filter array 241 having a programmable filter for each N possible users. The programmable filters are controlled by a steering/nulling circuit 243 for each user based on GPS data from each mobile user as described above. The programmable filters yield N baseband signals divided into ten channels which are transmitted to the antenna array 25' by a ten-channel transmitter 214. Each antenna $25'_1, \ldots, 25'_{10}$ receives a respective RF output signal $OUT_1, \ldots, OUT_{10}$ from the transmitter 214.

Although preferred embodiments of the invention have been described in the context of a cellular communication system, the principles of the invention can be applied to any communication system. For example, geo-location data and associated beamforming can be embodied in any radio frequency communication system such as satellite communication systems. Furthermore, the invention can be embodied in acoustic or optical communication systems.

EQUIVALENTS

While the invention has been particularly shown and described with reference to preferred embodiments thereof, it will be understood by those skilled in the art that various changes in form and details may be made therein without departing from the spirit and scope of the invention as defined by the appended claims. In particular, the various aspects of the invention can be embodied in hardware, software or firmware.

These and all other equivalents are intended to be encompassed by the following claims.

The invention claimed is:

1. A communication system comprising:
   a first mobile transceiver having a first processor and a first directional antenna;
   a second transceiver having a second processor and a second antenna;
   a locator coupled to the first transceiver for determining the physical location of the first antenna relative to the second antenna;
   a communication link formed between the first and second transceivers, the link including a first wireless beam from the first antenna to the second antenna and a second wireless beam from the second antenna to the first antenna;
   a first beamformer in the first transceiver for shaping the first wireless beam to be directed toward the second antenna so as to reduce interference, the first beamformer having a first deterministic direction finder to compute an angle of arrival of the second wireless beam; the angle of arrival being used by a first steering circuit in the first beamformer to determine a first beam steering direction of a first antenna pattern directed toward the second antenna, and the first beamformer having a first nulling circuit that rejects beams outside the first beam steering direction to the second antenna; and
   a second beamformer in the second transceiver for shaping the second wireless beam to be directed toward the first antenna so as to reduce interference, the second beamformer having a deterministic direction finder to compute an angle of arrival of the first wireless beam, the angle of arrival being used by a second steering circuit in the second beamformer to determine a second beam steering direction of a second antenna pattern directed toward the first antenna, and the second beamformer having a second nulling circuit that rejects beams outside the second beam steering direction to the first antenna.

2. The system of claim 1 wherein the first and second antennas are movable relative to one another and the beamformer updates the direction of the wireless beam in response to the relative motion of the antennas.

3. The system of claim 1 wherein the wireless beam is a radio frequency beam.

4. The system of claim 1 wherein the second antenna is in a mobile unit.

5. The system of claim 1 wherein the locator includes input from a satellite positioning system.

6. The system of claim 1 wherein the locator includes input from a ground-based positioning system.

7. The system of claim 1 where the communication link is spatially multiplexed.

8. A cellular communication system comprising:
   a base transceiver having a first directional antenna, the base transceiver having a fixed geographical location,
   a mobile transceiver having a second antenna, the second antenna being movable relative to the base transceiver;
   a spatially multiplexed communication link between the base and the mobile transceivers formed by a wireless signal between the antennas;
   a positioning system for detecting the geographical position of the second antenna, the position of the second antenna being communicated to the base transceiver over the communication link;
   a first beamformer in the base transceiver for modifying the signal in response to the relative motion of the antennas, the first beamformer having a first deterministic direction finder to compute a first angle of arrival of the wireless signal, the first angle of arrival being used by a first steering circuit in the first beamformer to determine a first antenna pattern directed toward the second antenna, the first beamformer having a first nulling circuit for rejecting signals outside a first beam direction of the second antenna; and
   a second beamformer in the mobile transceiver for modifying the signal in response to the relative motion of the antennas, the second beamformer having a second deterministic direction finder to compute a second angle of arrival of the wireless signal, the second angle of arrival being used by a second steering circuit in the second beamformer to determine a second beam steering direction of a second antenna pattern directed toward the first antenna, the second beamformer having a second nulling circuit for rejecting signals outside a second beam direction of the first antenna.

9. The system of claim 8 wherein the beamformer updates the direction of the wireless beam in response to the relative motion of the antennas.

10. The system of claim 8 wherein the signal is a radio frequency beam.

11. The system of claim 8 wherein the positioning system includes input from a satellite positioning system.

12. The system of claim 8 wherein the positioning system includes input from a ground-based positioning system.

13. The system of claim 8 wherein the beamformer includes a plurality of programmable filter arrays.

14. The system of claim 8 wherein the beamformer includes a table stored in memory for providing antenna weights to modify the signal.

15. The system of claim 8 wherein the second antenna is a directional antenna.

16. A method for operating a communication system comprising the steps of:
   providing a first mobile transceiver having a first processor and a first directional antenna;
   providing a second transceiver having a second processor and a second antenna;
   determining the physical location of the second antenna relative to the first antenna;
   forming a communication link between the first and second transceivers, the link including a first wireless beam from the first antenna to the second antenna and a second wireless beam from the second antenna to the first antenna;
   in a first beamformer in the first transceiver, responding to the relative physical location of the second antenna and shaping the first wireless beam to be directed toward the second antenna, the first beamformer having a first deterministic direction finder for computing a first angle of arrival of the second wireless beam, the first angle of arrival being used by a first steering circuit in the first beamformer for determining a first beam steering direction of a first antenna pattern directed toward the second antenna, and nulling a first plurality of wireless beams outside a beam direction of the second antenna; and in a second beamformer in the second transceiver, responding to the relative physical location of the first antenna and shaping the second wireless beam to be directed toward the first antenna, the second beamformer having a second deterministic direction finder for computing a second angle of arrival of the first wireless beam, the second angle of arrival being used by a second steering circuit in the second beamformer for determining a second beamsteering direction of a second antenna pattern directed toward the first antenna, and nulling a second plurality of wireless beams outside a beam direction of the first antenna.

17. The method of claim 16 wherein the first and second antennas are movable relative to one another and the beamformer updates the direction of the signal in response to the relative motion of the antennas.

18. The method of claim 16 wherein the wireless beam is a radio frequency beam.

19. The method of claim 16 wherein the second transceiver is in a mobile unit.

20. The method of claim 16 wherein the locator includes input from a satellite positioning system.

21. The method of claim 16 wherein the locator includes input from a ground-based positioning system.

22. The method of claim 16 where the communication link is spatially multiplexed.

23. A method of operating a cellular communication system comprising the steps of:
providing a base transceiver having a first directional antenna, the base transceiver having a fixed geographical position;
providing a mobile transceiver having a second antenna, the mobile being movable relative to the base transceiver;
a spatially multiplexed communication link between the base and mobile transceivers forming a wireless signal between the antennas;
in a positioning system, detecting the geographical position of the second antenna, the position of the second antenna being communicated to the base transceiver over the communication link;
in a first beamformer in the base transceiver, modifying the signal in response to the relative motion of the antennas, the first beamformer having a deterministic direction finder for computing a first angle of arrival of the wireless signal, the first angle of arrival being used by a first steering circuit in the first beamformer for determining a first beam steering direction of a first antenna pattern directed toward the second antenna, and nulling a first plurality of signals outside a beam direction of the antennas; and
in a second beamformer in the mobile transceiver, modifying the signal in response to the relative motion of the antennas, the second beamformer having a deterministic direction finder computing a second angle of arrival of the wireless signal, the second angle of arrival being used by a second steering circuit in the second beamformer for determining a second beam steering direction of a first antenna pattern directed toward the second antenna, and nulling a second plurality of signals outside a beam direction of the antennas.

24. The method of claim 23 wherein the step of modifying the signal comprises updating the direction of the signal in response to the relative motion of the antennas.

25. The method of claim 23 wherein the signal is a radio frequency beam.

26. The method of claim 23 wherein the step of detecting comprises receiving input from a satellite positioning system.

27. The method of claim 23 wherein the step of detecting comprises receiving input from a ground-based positioning system.

28. The method of claim 23 wherein the beamformer includes a plurality of programmable filter arrays.

29. The method of claim 23 wherein the step of modifying the signal comprises providing antenna weights from a table stored in memory.

30. The method of claim 23 wherein the second antenna is a directional antenna.

31. A cellular communication system comprising:
a base transceiver having a first directional antenna, the base transceiver having a fixed geographic position;
a mobile transceiver having a second directional antenna, the second directional antenna being movable relative to the base transceiver;
a wireless communication link between the base and mobile transceivers formed by a signal between the antennas;
a positioning system for detecting the geographical position of the second directional antenna, the position of the second directional antenna being communicated to the base transceiver over the communication link;
a first beamformer in the base transceiver and a second beamformer in the mobile transceiver for modifying the signal in response to the relative motion of the antennas, the first beamformer having a first deterministic direction finder to compute a first angle of arrival of the signal, the first angle of arrival being used by a first steering circuit in the first beamformer to determine a first beam steering direction of a first antenna pattern directed toward the second antenna, the first beamformer having a nulling circuit for rejecting signals outside a beam direction of the second antenna, the second beamformer having a second deterministic direction finder to compute a second angle of arrival of the signal, the second angle of arrival being used by a second steering circuit in the second beamformer to determine a second beam steering direction of a second antenna pattern directed toward the first antenna, the second beamformer having a nulling circuit for rejecting signals outside a beam direction of the first antenna.

32. The system of claim 31 wherein the beamformers update the direction of the wireless beam in response to the relative motion of the antennas.

33. The system of claim 31 wherein the beamformers modify the signal to be omnidirectional when the antennas are separated by less than a specific range.

34. The system of claim 31 wherein the signal is a radio frequency beam.

35. The system of claim 31 wherein the positioning system includes input from a satellite positioning system.

36. The system of claim 31 wherein the positioning system includes input from a ground-based positioning system.

37. The system of claim 31 wherein the beamformers include a plurality of programmable filter arrays.

38. The system of claim 31 wherein the beamformers include a table stored in memory for providing antenna weights to modify the signal.

39. A method of operating a cellular communication system comprising:
providing a base transceiver having a first directional antenna, the base transceiver having a fixed geographical position;

providing a mobile transceiver having a second directional antenna, the second directional antenna being movable relative to the base transceiver;
a wireless communication link between the base and mobile transceivers forming a signal between the antennas;
in a positioning system, detecting the geographical position of the mobile transceiver, the position of the second directional antenna being communicated to the base transceiver over the communication link;
in a first beamformer in the base transceiver and a second beamformer in the mobile transceiver, modifying the signal in response to the relative motion of the antennas, the first beamformer having a first deterministic direction finder for computing a first angle of arrival of the signal, the first signal of arrival being used by a first steering circuit in the first beamformer for determining a first antenna pattern to be directed toward the second antenna and nulling a first plurality of signals outside a beam direction of the antennas and the second beamformer having a second deterministic direction finder for computing a second angle of arrival of the signal, the second angle of arrival being used by a second steering circuit in the second beamformer for determining a second antenna pattern to be directed toward the first antenna.

40. The method of claim 39 wherein the step of modifying the signal comprises updating the direction of the signal in response to the relative motion of the antennas.

41. The method of claim 40 wherein the step of modifying comprises determining the range between the antennas and, when the range is less than a specific range, modifying the signal to be omnidirectional.

42. The method of claim 39 wherein the signal is a radio frequency beam.

43. The method of claim 39 wherein the step of detecting comprises receiving input from a satellite positioning system.

44. The method of claim 39 wherein the step of detecting comprises receiving input from a ground-based positioning system.

45. The method of claim 39 wherein the beamformers include a plurality of programmable filter arrays.

46. The method of claim 39 wherein the step of modifying the signal comprises providing antenna weights from a table stored in memory.

47. A communication system comprising:
a first transceiver having a first processor and a first directional antenna;
a second transceiver having a second processor and a second antenna;
a locator coupled to the first transceiver for determining a physical
location of the first transceiver relative to the second antenna;
a spatially multiplexed communication link formed between the first and second transceivers, the link including a first wireless beam from the first antenna to the second antenna; and a second wireless beam from the second antenna to the first antenna;
a first beamformer in the first transceiver for shaping the first wireless beam to be directed toward the second antenna, the first beamformer having a first deterministic direction finder to compute an angle of arrival of the second wireless beam; the angle of arrival being used by a first steering circuit in the first beamformer to determine a first beam steering direction of a first antenna pattern directed toward the second antenna, and the first beamformer having a first nulling circuit that rejects beams outside the first beam steering direction to the second antenna; and
a second beamformer in the second transceiver for shaping the second wireless beam to be directed toward the first antenna, the second beamformer having a second deterministic direction finder to compute a second angle of arrival of the first wireless beam, the second angle of arrival being used by a second steering circuit in the second beamformer to determine a second beam steering direction of a second antenna pattern directed toward the first antenna, and the second beamformer having a second nulling circuit that rejects beams outside the second beam steering direction to the first antenna.

48. The system of claim 47 wherein the first and second antennas are movable relative to one another and the beamformer updates the direction of the wireless beam in response to the relative motion of the movable antenna.

49. The system of claim 47 wherein the wireless beam is a radio frequency beam.

50. The system of claim 47 wherein the first transceiver is a stationary base station and the second antenna is in a mobile unit.

51. The system of claim 47 wherein the locator includes input from a satellite positioning system.

52. The system of claim 47 wherein the locator includes input from a ground-based positioning system.

53. The system of claim 47 wherein the first transceiver is a mobile transceiver and the second transceiver is a stationary transceiver.

54. A method for operating a communication system comprising the steps of:
providing a first transceiver having a first processor and a first directional antenna;
providing a second transceiver having a second processor and a second antenna;
determining a physical location of the second antenna relative to the first antenna;
forming a spatially multiplexed communication link between the first and second transceivers, the link including a first wireless beam from the first antenna to the second antenna, and a second wireless beam from the second antenna to the first antenna;
in a first beamformer in the first transceiver, responding to the physical location of the second antenna and shaping the first wireless beam to be directed toward the second antenna, the first beamformer having a first deterministic direction finder for computing a first angle of arrival of the second wireless beam, the first angle of arrival being used by a first steering circuit in the first beamformer for determining a first antenna pattern to be directed toward the second antenna, and nulling beams outside a beam direction of the second antenna; and
in a second beamformer in the second transceiver, responding to the physical location of the first antenna and shaping the second wireless beam to be directed toward the first antenna, the second beamformer having a second deterministic direction finder for computing a second angle of arrival of the first wireless beam, the second angle of arrival being used by a second steering circuit in the second beamformer for determining a second antenna pattern to be directed toward the first antenna and nulling beams outside a second beam direction of the first antenna.

55. The method of claim 54 wherein the first and second directional antennas are movable relative to one another and the beamformer updates the direction of the signal over time in response to the relative movement of the antennas.

56. The method of claim 54 wherein the wireless beam is a radio frequency beam.

57. The method of claim 54 wherein the first transceiver is in a cellular mobile unit and the second transceiver is in a cellular base station.

58. The method of claim 54 wherein the locator includes input from a satellite positioning system.

59. The method of claim 54 wherein the locator includes input from a ground-based positioning system.

60. The method of claim 54 wherein the first transceiver is in a cellular base station and the second transceiver is in a cellular mobile unit.

* * * * *